United States Patent
Mannhart

(10) Patent No.: US 7,648,107 B2
(45) Date of Patent: Jan. 19, 2010

(54) BRACE OR PIPE CLAMP

(75) Inventor: Hubert Mannhart, Sargans (CH)

(73) Assignee: Straub Werke AG, Wangs (CH)

( * ) Notice: Subject to any disclaimer, the term of this patent is extended or adjusted under 35 U.S.C. 154(b) by 0 days.

(21) Appl. No.: 12/093,056

(22) PCT Filed: Nov. 7, 2006

(86) PCT No.: PCT/IB2006/054136

§ 371 (c)(1),
(2), (4) Date: Sep. 15, 2008

(87) PCT Pub. No.: WO2007/060563

PCT Pub. Date: May 31, 2007

(65) Prior Publication Data

US 2009/0014600 A1    Jan. 15, 2009

(30) Foreign Application Priority Data

Nov. 23, 2005   (CH) .................................. 1871/05

(51) Int. Cl.
*F16L 3/08* (2006.01)

(52) U.S. Cl. ................. 248/74.1; 24/279; 248/74.3; 285/365

(58) Field of Classification Search .............. 248/49, 248/62, 65, 67.5, 67.7, 74.1, 74.2, 74.3, 70, 248/73; 24/279; 285/365
See application file for complete search history.

(56) References Cited

U.S. PATENT DOCUMENTS

| | | | | |
|---|---|---|---|---|
| 2,409,576 | A | | 10/1946 | Markey |
| 4,643,460 | A | * | 2/1987 | Lieberg ........................ 285/112 |
| 4,969,923 | A | * | 11/1990 | Reeder et al. ................ 285/365 |
| 5,010,626 | A | * | 4/1991 | Dominguez ................... 24/279 |
| 5,329,673 | A | * | 7/1994 | Mason .......................... 24/279 |
| 6,030,006 | A | * | 2/2000 | Lin .............................. 285/411 |
| 6,340,142 | B1 | * | 1/2002 | Li ............................... 248/74.1 |
| 6,691,379 | B2 | * | 2/2004 | Schaub ......................... 24/279 |
| 7,472,870 | B2 | * | 1/2009 | Zagorski et al. ................ 248/65 |
| 2003/0072636 | A1 | | 4/2003 | Boe |
| 2005/0273984 | A1 | * | 12/2005 | Anderson et al. .............. 24/279 |
| 2007/0209166 | A1 | * | 9/2007 | Lovgren et al. ................ 24/279 |
| 2008/0184536 | A1 | * | 8/2008 | Rigollet et al. ................ 24/279 |

FOREIGN PATENT DOCUMENTS

| | | |
|---|---|---|
| EP | 0989349 A | 3/2000 |
| FR | 1358890 A | 4/1964 |
| FR | 2749917 A1 | 12/1997 |

OTHER PUBLICATIONS

International Search Report for PCT/IB2006/054136.

* cited by examiner

*Primary Examiner*—Ramon O Ramirez
(74) *Attorney, Agent, or Firm*—Matthew B. Dernier, Esq.; Gibson & Dernier LLP

(57) ABSTRACT

Brace or pipe clamp with a deformable, essentially cylindrical housing, which has at least one longitudinal slot. The regions of the housing that are situated opposite one another at the longitudinal slot are formed as bent over lugs. The lugs are used to accommodate hollow bolts. The housing can be braced by means of clamping bolts, which penetrate the hollow bolts transversely and are arranged approximately tangentially to the housing, and nuts which can be connected to said clamping bolts. At least one of the clamping bolts is connected directly or indirectly with a handle for manually pretensioning the brace or pipe clamp and/or for operating the clamping bolt.

20 Claims, 4 Drawing Sheets

BRACE OR PIPE CLAMP

BACKGROUND

The invention relates to a brace or pipe clamp with a deformable, essentially cylindrical housing which has at least one longitudinal slot, wherein the regions of the housing that are situated opposite one another at the longitudinal slot are formed as bent over lugs, wherein the lugs are formed for accommodating hollow bolts and wherein the brace or pipe clamp can be clamped by means of clamping bolts, which penetrate the hollow bolts transversely and are arranged approximately tangentially to the housing, and nuts in the hollow bolts which can be connected to said clamping bolts.

Brace or pipe clamps are used on the one hand for connecting or repairing pipes which have started to leak and on the other hand for the fixation of piping in buildings or vehicles. In the first case, seals in the form of sleeves or the like which are pressed against the outer surface of the pipes by the brace or pipe clamp are used to seal the pipe joints or leaks. The bracing of such brace or pipe clamps is however very expensive and requires the use of special tools or devices which are for example formed as what is known as a collet. The time required for the method used to date can also be considerable, in particular when relatively large differences in diameter need to be bridged during bracing.

U.S. Pat. No. 2,409,576 discloses a pipe clamp for exhaust systems. This has a clamping bolt and a stirrup-shaped spring element which is pivotably connected to the bolt. The spring element is part of the closure and is used to compensate the expansion of components as a result of changes in temperature. In order to brace the pipe clamp, the spring element is hung on a hook of the closure and then pretensioned to a defined value by means of the clamping bolt. The spring element is therefore permanently subjected to pretensioning and cannot move freely.

FR 2 749 917 discloses a pipe clamp with clamping bolts which can be braced by nuts. A cam lever is connected pivotably with the clamping bolts at the head end of the clamping bolts. The cam lever is used to open and close the pipe clamp rapidly. In the braced state the pipe clamp transfers the tensioning force to the cam lever and can only be brought into the unbraced position by overcoming a defined resistance.

SUMMARY OF THE INVENTION

The invention is based on the object of creating a brace or pipe clamp, which can be braced without additional tools and in a short time.

This is achieved according to the invention in that at least one of the clamping bolts is connected directly or indirectly with a handle for manually pretensioning the pipe clamp and/or for operating the clamping bolt and/or for carrying the brace or pipe clamp, wherein the handle is mounted such that it can pivot freely and is free of tensioning force when the brace or pipe clamp is braced.

The handle therefore replaces the special tool and has the substantial advantage compared to such a tool that it is always available and for example can also be used when removing the brace or pipe clamp. The handle is also very useful during handling and mounting or aligning, as well as transporting the brace or pipe clamp.

The handle is expediently connected indirectly to the clamping bolt by means of at least one washer, which is arranged on the shaft of the clamping bolt. This connection of the handle to the clamping bolt means that the latter can be pivoted or locked in or out after being released by means of the handle.

Advantageously, at least two clamping bolts are provided, in which case both clamping bolts are connected to the handle. The handle is thus arranged between the clamping bolts, which allows a symmetrical distribution of force and thus a uniform bracing of the brace or pipe clamp over its entire length.

The handle is expediently connected pivotably—preferably by means of an articulation—to the clamping bolts. The pivotable arrangement of the handle means that the latter can be aligned in the optimum direction for applying the tensioning force, preferably approximately tangentially to the housing, when bracing the brace or pipe clamp. After the brace or pipe clamp has been braced, the handle can be folded around in such a manner that it does not significantly project beyond the periphery of the housing.

The handle can advantageously be snapped backwards, removed and/or locked with the clamping bolts, or can be connected or is connected with washers and is preferably formed from a wire. The handle can thus also be removed if required after the brace or pipe clamp has been braced, or attached again for releasing.

The housing is expediently and according to an independent invention formed in two parts and has two longitudinal slots and closures arranged approximately diametrically opposite one another, whereby at least one clamping bolt of at least one closure is connected with a handle. Such a form is expedient in particular where the pipe has a relatively large diameter. The division between two closures means that a larger bracing region and a more uniform distribution of force over the circumference of the pipe is produced.

Smaller brace or pipe clamps are very often formed in two parts for assembly reasons. In this case it is advantageous that at least one of the two closures is formed as an articulation. Such closures can however also have an articulating and a closing function at the same time.

The nut is arranged in one of the hollow bolts and spatially fixed, wherein at least the hollow bolt in which the nut is arranged has an essentially U-shaped cross section. In one exemplary embodiment according to a further independent invention, the nut is fixed—in particular against rotation—by means of at least one embossed part—which preferably runs approximately transversely with respect to the direction of the nut axis—through the case of the hollow bolt between the limbs of the U-shaped hollow bolt. The embossed part produces a form fit between the nut and the hollow bolt, which prevents the nut from slipping or rotating with respect to the hollow bolt.

In each case at least two embossed parts, which are arranged opposite one another, are advantageously provided laterally with respect to the flats of the nut. These embossed parts prevent on the one hand the nut from slipping in the direction of the hollow bolt axis and on the other hand the nut from rotating as well when the clamping bolts are tightened.

Two embossed parts in each case are expediently arranged in the region of the top side and at least one embossed part is arranged in the region of the underside of the nut. The embossed part on the underside of the nut secures it in the axial direction, i.e. in the direction of the clamping bolt axis, from falling out when the clamping bolts are released.

In another exemplary embodiment and according to an independent invention, the lugs of the housing are advantageously bent over towards the inside of the housing. This produces a smooth outside of the housing, which has a positive effect in particular on the corrosion resistance of the brace or pipe clamp. The ends of the lugs situated on the inside of the housing are pressed radially against the pipe by the outer part of the housing when the brace or pipe clamp is braced. This produced an additional frictional connection between the bent over free ends of the lugs and the inside of the housing, which relieves the required connection.

The bent over ends of the lugs are expediently connected with the periphery of the housing by means of a series of press join connections (clinches). Such press join connections are advantageous compared to conventional welded connections, in particular for reasons of corrosion protection, since no elevated temperatures and associated structural changes occur.

In order that the hollow bolts stay aligned in the desired rotation position when the brace or pipe clamp is braced, it is expedient according to an independent invention for the hollow bolts to be secured relative to the lug against unintentional rotation with respect to the lugs by means of stoppers which can be inserted in the ends of the hollow bolts. To this end, the stoppers advantageously have a projection which engages in a slot in the lugs and in the longitudinal slot in the hollow bolt. The slot in the lug and the longitudinal slot in the hollow bolt are thus always aligned with respect to each other, even when the clamping bolts are not inserted.

The stoppers are expediently formed from plastic and preferably have a surface for printing information and/or colour. Giving an appropriate colour to the plastic stoppers can indicate visually the typical company colour of the manufacturer of the brace or pipe clamp (e.g. red or blue) or the intended use of the brace or pipe clamp (e.g. yellow for gas lines).

BRIEF DESCRIPTION OF THE DRAWINGS

The invention is explained in more detail below using the drawings which illustrate it by way of example. In the figures.

DETAILED DESCRIPTION OF THE INVENTION

Figure 1:
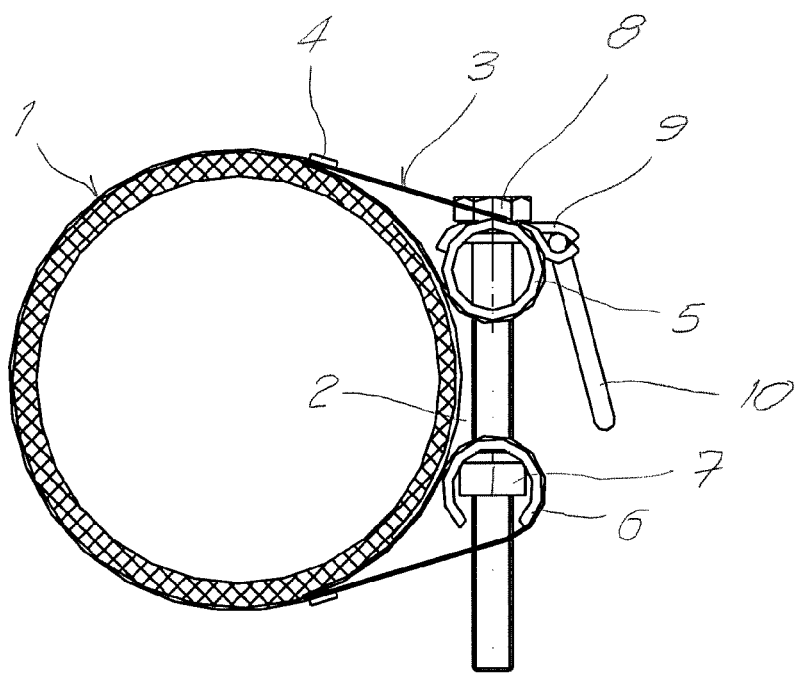
FIG. 1 shows a single-part brace or pipe clamp according to the invention, viewed from the end.

The brace or pipe clamp which can be seen in FIG. 1 consists essentially of a single-part housing 1 with a longitudinal slot 2. The ends of the housing 1 are formed as lugs 3 which are bent over towards the inside. The free end of the lugs 3 is connected by press join connections 4 with the periphery of the housing 1. This press join connection 4 is also known by the technical term "clinch". Hollow bolts 5, 6 are inserted into the lugs 3. The hollow bolt 5 has a cylindrical shape, the hollow bolt 6 has a C-shaped cross section. A nut 7 is inserted into the hollow bolt 6 and connected form-fittingly with the hollow bolt 6. The hollow bolts 5, 6 are penetrated transversely by clamping bolts 8. A washer 9 is arranged between the head of the clamping bolt 8 and the hollow bolt 5. The washer 9 has resilient tabs, which together with a stirrup-shaped handle 10 form an articulation. The handle 10 is thus pivotably connected to the clamping bolt 8 and can be folded out or pivoted in as required. With the aid of the handle 10, the housing 1 can be pulled together, with the two hollow bolts 5, 6 moving towards each other, when the brace or pipe clamp is braced, in such a manner that the clamping bolts 8 can be hung on the hollow bolt 5.

Figure 2:
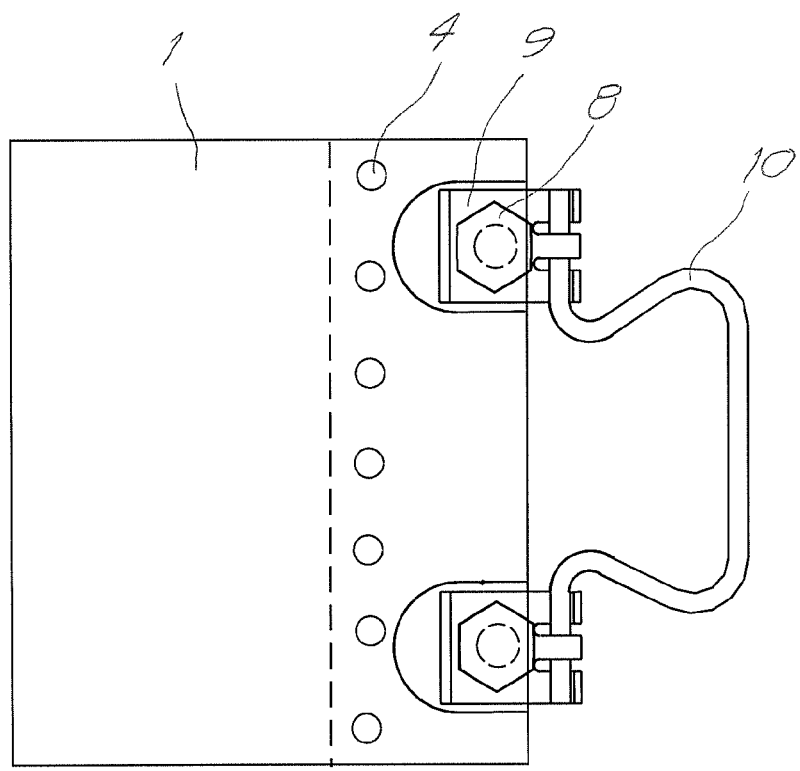
FIG. 2 shows a plan view of the brace or pipe clamp shown in FIG. 1, with two clamping bolts and handle folded away.
Figure 3:
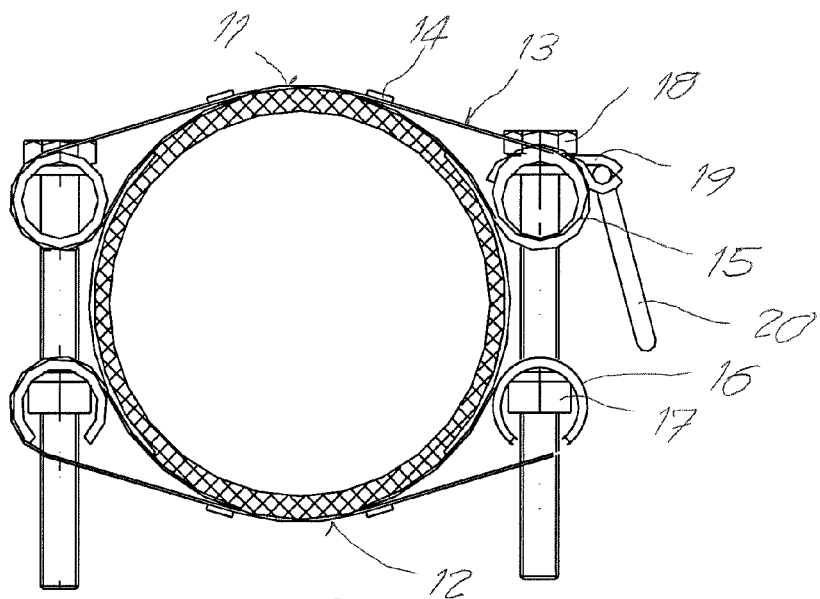
FIG. 3 shows a further embodiment of a two-part brace or pipe clamp according to the invention, viewed from the end.
Figure 4:
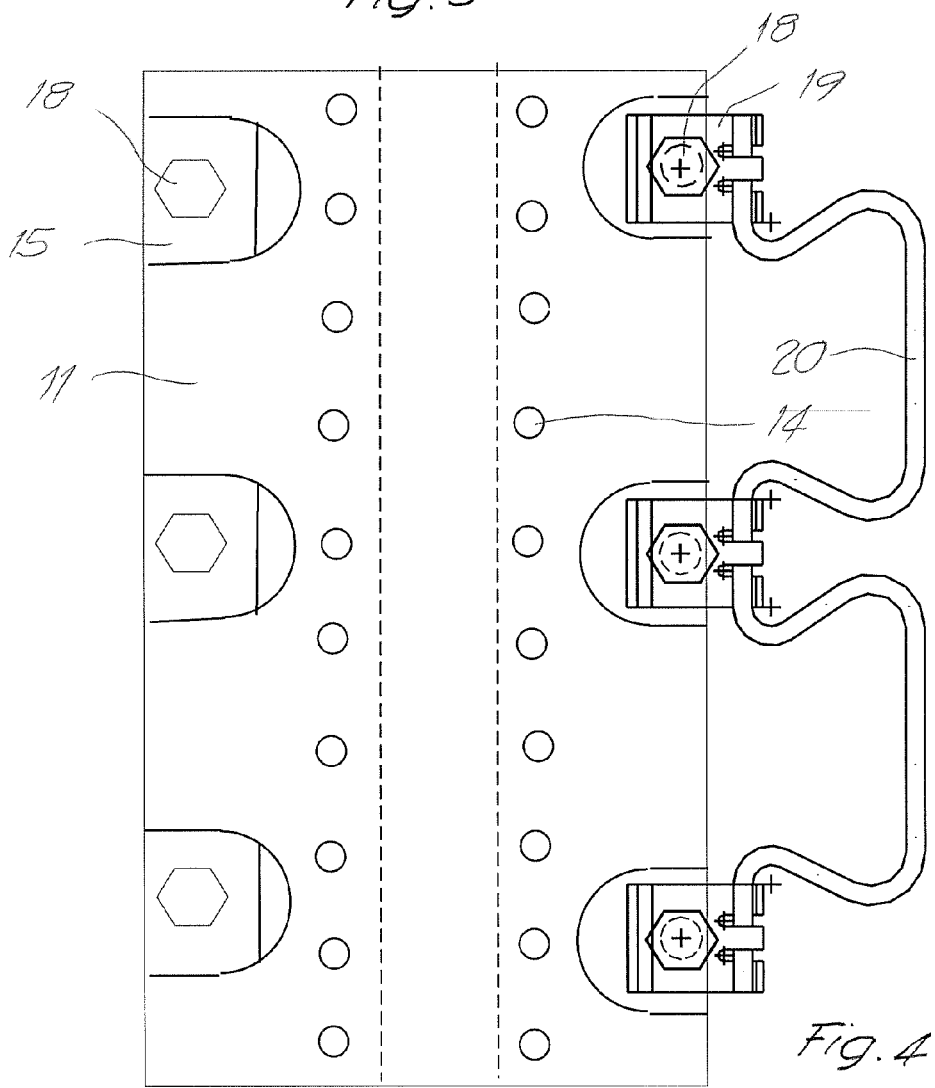
FIG. 4 shows a plan view of the brace or pipe clamp shown in FIG. 3, with three clamping bolts and handle folded away.

The embodiment which can be seen in FIGS. 3 and 4 differs from the embodiment shown in FIGS. 1 and 2 in that it consists of two identical housings 11, 12, which likewise have lugs 13 which are bent over towards the inside. The free ends of the lugs 13 are likewise connected by press join connections with the periphery of the housing 11, 12. Hollow bolts 15, 16 are inserted into the lugs 13. The hollow bolts 15 have a cylindrical shape, the hollow bolts 16 have a C-shaped cross section. Nuts 17 are inserted in the hollow bolts 16. The two hollow bolts 15, 16 are penetrated transversely by clamping bolts 18. A washer 19 is arranged between the head of the clamping bolt 18 and the hollow bolt 15. A handle 20 is connected pivotably to the washer 19 in the same manner as in the embodiment shown in FIGS. 1 and 2. The handle 20 is used likewise as an aid during bracing of the brace or pipe clamp.

Figure 5:
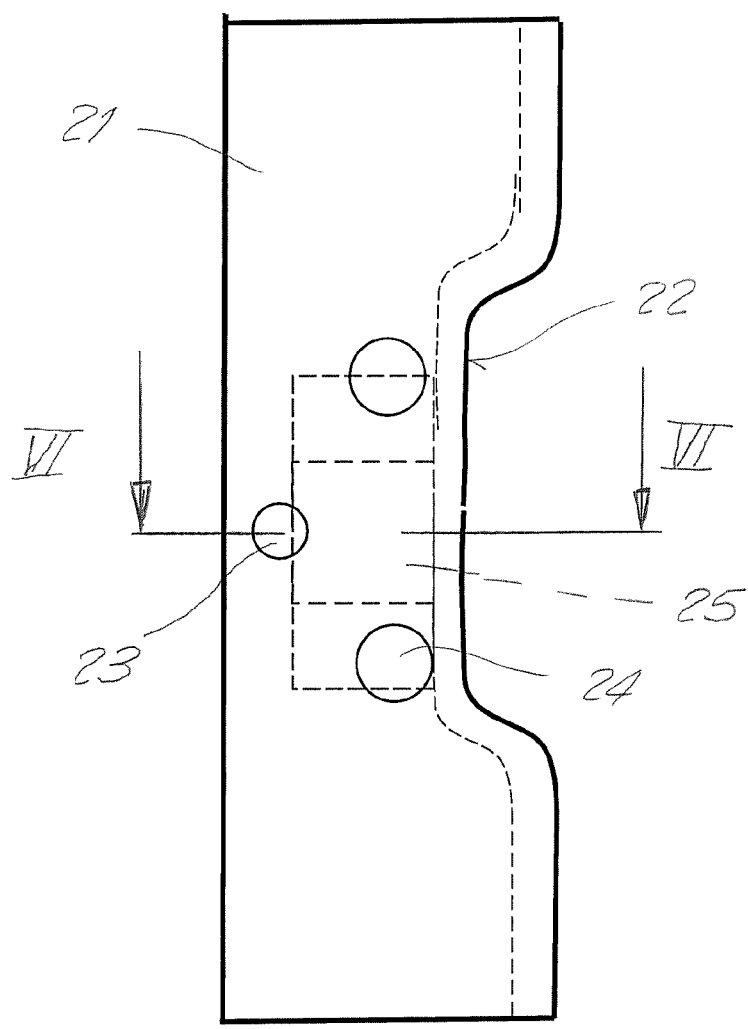
FIG. 5 shows a hollow bolt according to the invention; in a longitudinal view.
Figure 6:
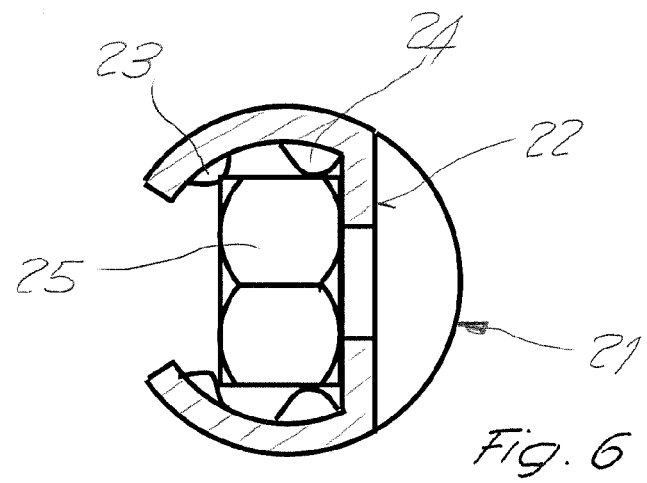
FIG. 6 shows a cross section through the hollow bolt shown in FIG. 5, along line VI-VI.

In FIGS. 5 and 6, a hollow bolt 21 is shown on an enlarged scale. The hollow bolt has in its central region a flattened portion 22 and is provided laterally in this region with embossed parts 23, 24. The embossed parts 23, 24 are used to fix a nut 25, which is inserted into the hollow bolt 21 and bears against the inside of the flattened portion 22. The nut 25 is thus connected to the hollow bolt 21 in a form-fitting manner. Depending on the desired width of the brace or pipe clamp, and the corresponding length of the hollow bolt, the hollow bolt 21 can have one or a plurality of flattened portions, or be penetrated by one or a plurality of clamping bolts.

Figure 7:
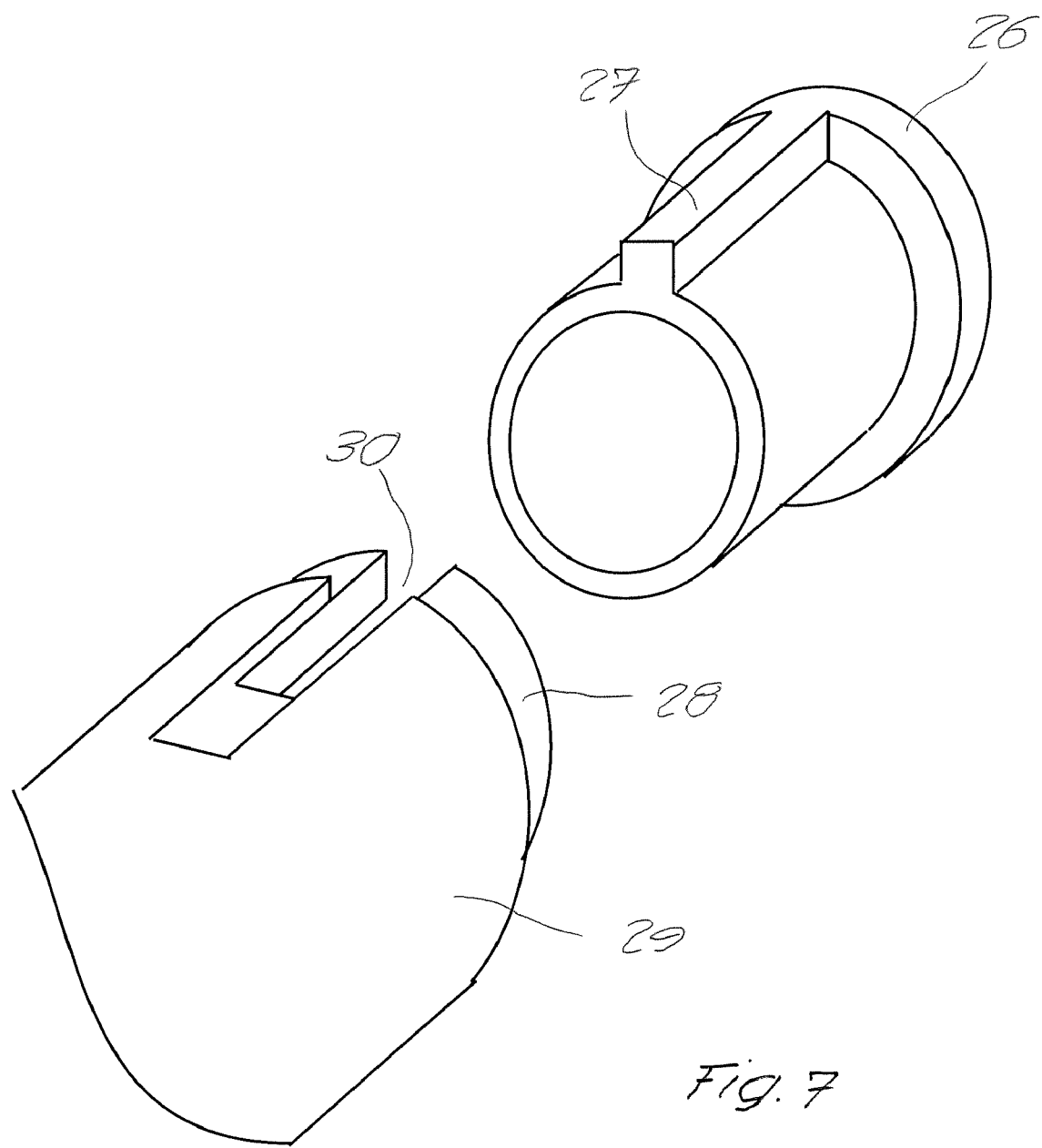
FIG. 7 shows a stopper for rotary locking of the hollow bolt

In order that the hollow bolt cannot rotate in an undesired manner when the brace or pipe clamp is open, a stopper 26 is used, which can be seen in FIG. 7 and is introduced into the end of a hollow bolt 28. The stopper 26 has a projection 27 on the part where its diameter tapers. This projection 27 engages in an aligned slot 30 on the hollow bolt 28 and on a lug 29 and thus forms an anti-rotation element between the hollow bolt 28 and the lug 29.

LIST OF REFERENCE SYMBOLS

1 Housing
2 Longitudinal slot
3 Lug
4 Press join connection
5 Hollow bolt
6 Hollow bolt
7 Nut
8 Clamping bolt
9 Washer
10 Handle
11 Housing
12 Housing
13 Lug
14 Press join connection
15 Hollow bolt
16 Hollow bolt
17 Nut
18 Clamping bolt
19 Washer
20 Handle
21 Hollow bolt
22 Flattened portion
23 Embossed part
24 Embossed part 25 Nut
26 Stopper
27 Projection
28 Hollow bolt
29 Lug
30 Slot

The invention claimed is:

1. A brace or pipe clamp, comprising a deformable, essentially cylindrical housing, which has at least one longitudinal slot, wherein:
   regions of the housing that are situated opposite one another at the longitudinal slot are formed as bent over lugs,
   the lugs are formed for accommodating hollow bolts, and wherein the brace or pipe clamp can be braced by means of at least one clamping bolt, which penetrates the hollow bolts transversely and is arranged approximately tangentially to said housing, and at least one corresponding nut in one of said hollow bolts, said at least one nut configured for connection to said at least one clamping bolt,
   said at least one clamping bolt being connected directly or indirectly with a handle for manually pretensioning the brace or pipe clamp, for operating said at least one clamping bolt, and for carrying the brace or pipe clamp, and,
   said handle is mounted such that it is operable to pivot freely and such that it is free of tensioning force when the brace or pipe clamp is braced,
   said nut being arranged in one of said hollow bolts and spatially fixed,
   said hollow bolt in which said nut is arranged having a generally C-shaped cross section,
   said nut being fixed against rotation by means of at least one embossed part running approximately transversely with respect to a direction of an axis of said nut through a case of said generally C-shaped hollow bolt, between limbs of said generally C-shaped hollow bolt.

2. The brace or pipe clamp according to claim 1, wherein said handle is connected indirectly to said at least one clamping bolt by means of at least one washer arranged on the shaft of said clamping bolt.

3. The brace or pipe clamp according to claim 1, wherein at least two clamping bolts are provided and said clamping bolts are connected to said handle.

4. The brace or pipe clamp according to claim 3, wherein said handle is connected pivotably by means of an articulation to said clamping bolts or to at least one washer arranged on the shaft of at least one clamping bolt.

5. The brace or pipe clamp according to claim 4, wherein said handle is operable to be snapped in, removed or locked with said clamping bolts, or is connected with said at least one washer, and is formed from a wire.

6. The brace or pipe clamp in particular according to claim 1, wherein said housing is formed in two parts and has two longitudinal slots and closures arranged approximately diametrically opposite one another, and at least one clamping bolt of at least one of said closures is connected with said handle.

7. The brace or pipe clamp according to claim 6, wherein at least one of said closures is formed as an articulation.

8. A brace or pipe clamp according to claim 1 further comprising, at least two embossed parts arranged opposite one another are provided laterally with respect to flats of said at least one nut.

9. The brace or pipe clamp according to claim 8, wherein two embossed parts are arranged in a region of a top side of said at least one nut, and at least one embossed part is arranged in the region of the underside of said at least one nut.

10. The brace or pipe clamp in accordance with claim 1, wherein said lugs of said housing are bent over towards an inside of the housing.

11. The brace or pipe clamp according to claim 10, wherein the bent over ends of said lugs are connected with a periphery of the housing by means of a series of press join connections.

12. The brace or pipe clamp in accordance with claim 1, wherein said hollow bolts are secured against unintentional rotation with respect to said lugs by means of stoppers inserted in their ends.

13. The brace or pipe clamp according to claim 12, wherein said stoppers have a projection which engages in a slot in the lug and in a longitudinal slot in the hollow bolt.

14. The brace or pipe clamp according to claim 12, wherein said stoppers are formed from plastic and have a surface suitable for printing.

15. A pipe clamp comprising:
   a housing;
   a longitudinal slot in said housing;
   two ends of said housing defining said longitudinal slot;
   two lugs formed respectively, one at each of said two ends of said housing;
   a first hollow bolt received in a first of said lugs;
   a second hollow bolt received in a second of said lugs, said second hollow bolt having a generally C-shaped cross section;
   two clamping bolts configured to span said longitudinal slot and to fasten to said first and second hollow bolts;
   said two clamping bolts each having a respective threaded rod portion;
   said clamping bolt threaded rod portions being fastened by threaded connections to said second hollow bolt having a generally C-shaped cross section;
   said two clamping bolts each having a respective bolt head;
   a pivotable handle operatively connected to said two bolt heads, said pivotable handle configured to operatively lift and lower said bolts out-of and into, respectively, slots in said first hollow bolt and said first lug; and,
   said pivotable handle being operatively connected to said two bolt heads to pivot freely relative thereto and to lie free of tensioning force when the pipe clamp is braced.

16. A pipe clamp as recited in claim 15, further comprising:
   washers respectively disposed on each one of said two clamping bolts proximate to its respective bolt head; and,
   said pivotable handle being connected to said washers.

17. A pipe clamp as recited in claim 15, further comprising:
   two nuts disposed in said second hollow bolt and configured to receive said threaded rod portions to effect said threaded connections.

18. A pipe clamp as recited in claim 17, further comprising:
   embossed parts configured to fix said nuts against rotation relative to said second hollow bolt, said embossed parts being located in said second hollow bolt.

19. A pipe clamp as recited in claim 15, further comprising:
   antirotation stoppers engaging said lugs and said hollow bolts.

20. A pipe clamp comprising:
   a housing;
   said housing having a first part;
   said housing having a second part;
   two longitudinal slots formed between said first part and said second part;
   said first part having two ends;

two lugs formed, one respectively at each of said two ends of said first part;

two lugs formed, one respectively at each of said two ends of said second part;

a first hollow bolt received in a first of said two lugs of said first part;

a second hollow bolt received in a first of said two lugs of said second part, said second hollow bolt having a generally C-shaped cross section;

a plurality of clamping bolts configured to span one of said longitudinal slots and to fasten to said first and second hollow bolts;

said plural clamping bolts each having a respective threaded rod portion;

said clamping bolt threaded rod portions being fastened by threaded connections to said second hollow bolt having a generally C-shaped cross section;

said plural clamping bolts each having a respective bolt head;

a pivotable handle operatively connected to said plural bolt heads, said pivotable handle configured to operatively lift and lower said plural bolts out-of and into, respectively, slots in said first hollow bolt and said first lug of said first part; and, said pivotable handle being operatively connected to said two bolt heads to pivot freely relative thereto and to lie free of tensioning force when the pipe clamp is braced.

\* \* \* \* \*